Oct. 4, 1927.
W. S. KNUDSEN
1,644,021
METHOD OF MAKING POPPET VALVES
Filed April 2, 1925   2 Sheets-Sheet 1
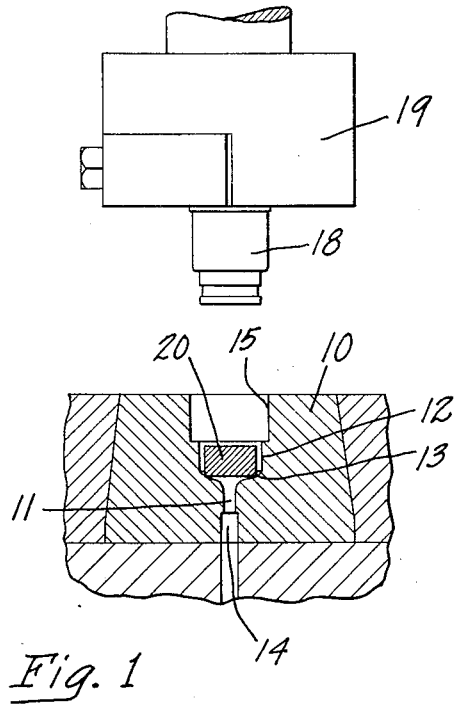
Fig. 1
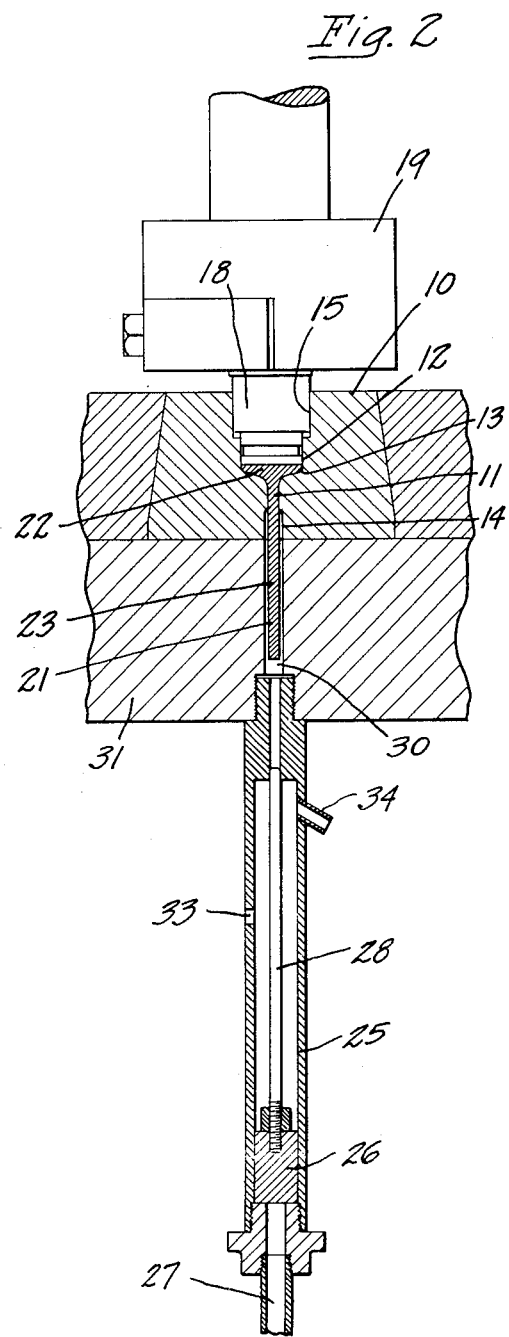
Fig. 2
Fig. 6
INVENTOR
WILLIAM S. KNUDSEN
BY
ATTORNEYS Oct. 4, 1927.

W. S. KNUDSEN 1,644,021

METHOD OF MAKING POPPET VALVES

Filed April 2, 1925          2 Sheets-Sheet 2

INVENTOR
WILLIAM S. KNUDSEN
BY
ATTORNEYS

Patented Oct. 4, 1927.

1,644,021

UNITED STATES PATENT OFFICE.

WILLIAM S. KNUDSEN, OF DETROIT, MICHIGAN, ASSIGNOR TO GENERAL MOTORS CORPORATION, OF DETROIT, MICHIGAN, A CORPORATION OF DELAWARE.

METHOD OF MAKING POPPET VALVES.

Application filed April 2, 1925. Serial No. 20,165.

The present invention relates to a process of making headed articles, i. e., articles consisting of a more or less slender shank or spindle provided at one end with a head or portion of a greater lateral dimension. It relates particularly to the manufacture of poppet valves, bolts, screws, and the like.

Heretofore in the manufacture of such articles, several processes have been used. In one process, the article is machined from a bar having the diameter of approximately that of the finished head. Another process consists in "upsetting" a head on a piece of the approximate diameter of the shank.

The first of these processes produces articles of good quality but at greater expense and waste of material. The second produces an article of good quality as long as the head area does not exceed a certain small increase over the area of the shank. When the ratio of the head area to the shank area exceeds about two and a half, the upset portion is likely to have cracks about its periphery and in all cases will be somewhat spongy. In making articles such as poppet valves, this limitation is fatal to the process.

On the other hand, in the present process, the difference in area between the shank and head makes little if any difference and articles produced by it are free from defects of this character.

The present process is one of extrusion and comprises, broadly, the production in one operation of a head and shank of the proper sizes, requiring only the finishing step of surfacing by grinding or otherwise.

In carrying out the process use is made of the apparatus and steps indicated in the drawings, in which:

Fig. 1 is an elevation of the plunger and die with the die in section and the plunger elevated.

Fig. 2 is a similar view with the plunger at the end of the stroke and also the ejecting device.

Fig. 6 shows a valve made in the process with part in section to illustrate the metallographic structure.

Figure 3:
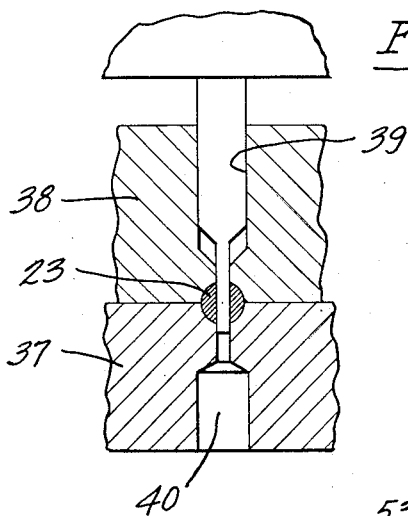
Fig. 3 is a vertical section of the piercing device.

In the process of making valves, a punch press (not shown) is fitted with a die as is indicated at 10. This die is of the form shown, that is, it has a passage through its lower portion, at 11, of the size of the valve stem and the countersunk portion 12 which is formed at its bottom into a matrix for the valve head as is indicated at 13. Passage 11 is countersunk from the underside of the die as at 14 to permit the stem freedom from contact after passing the die and countersink 12 is also countersunk as at 15 to permit a strengthening and pilot portion of the male die to enter.

The male die 18 is carried by the plunger 19 of the press and fits snugly within die 10, having its lower end flat or of the configuration desired, depending upon the article being produced.

In operating the process, metal, such as steel of any variety in the form of round bars or rods of somewhat less diameter than that of the die cavity 12, is cut off in pieces containing slightly more metal than is to be in the finished article. The cylindrical slug 20 thus obtained is then heated to a temperature of about 1500 to 1900° F. and placed in the die as indicated in Fig. 1. It is preferable to lubricate the die before the operation by swabbing with a high flash oil such as quenching or tempering oil with a flash at about 700° F.

When the slug 20 has been placed as indicated, the press is operated to the position shown in Fig. 2. Using one of the harder alloy steels, this operation requires very high pressure and is being successfully accomplished with a press capable of operating at 125 tons in the manufacture of valves for the Chevrolet engine.

This operation of the plunger causes extrusion of the metal to the form indicated in Fig. 2 at 21, i. e., a piece having a head of the desired form, such as a valve head 22, and a shank or spindle 23. In this particular valve the overall length as it comes from the extrusion die is about 6 inches, the diameter of the shank $\tfrac{7}{16}$ inches, and the diameter of the head 1 9/16 inches, and the steel used is of about the following analysis:

| | Per cent. |
|---|---|
| Silicon | 3.60–4.20 |
| Chromium | 1.85–2.50 |
| Carbon | .35– .45 |
| Manganese | .25– .40 |
| Phosphorus } Sulphur } | under .05 |

The piece 21 is ejected from the die by steady pressure from below after lifting the plunger. This is accomplished by the device shown in Fig. 2 in which 25 is a cylinder having a closely fitting piston 26 below which air under compression is admitted through inlet 27.

Piston 26 carries a rod 28 which passes through the upper end of the cylinder 25 into a passage 30 through the bed plate 31 of the press. Passage 30 registers with the countersink 14 and die 10 and rod 28 is adapted to pass into these passages, contact with the lower end of piece 21 and exert sufficient pressure to force the piece out of the die.

Cylinder 25 is also provided with an air relief opening 33 which relieves the air pressure when the upper end of rod 28 reaches the matrix portion of die 10, and after the air supply has been cut off the piston 26 and rod 28 return by gravity.

Cylinder 25 is also provided with a drain 34 through which any oil running down from the die may drain when the piston is in its uppermost position.

After the piece 21 has been ejected from the die, it is preferably placed, while still hot, in a piercing die as indicated in Fig. 3 and a slot 36 formed in the shank 23. In Fig. 3 the die is shown as in two parts 37 and 38 between which the shank 23 is clamped, these parts being provided with passages 39 and 40 for the piercing punch 41 and punched out slug 42 respectively.

Figure 4:
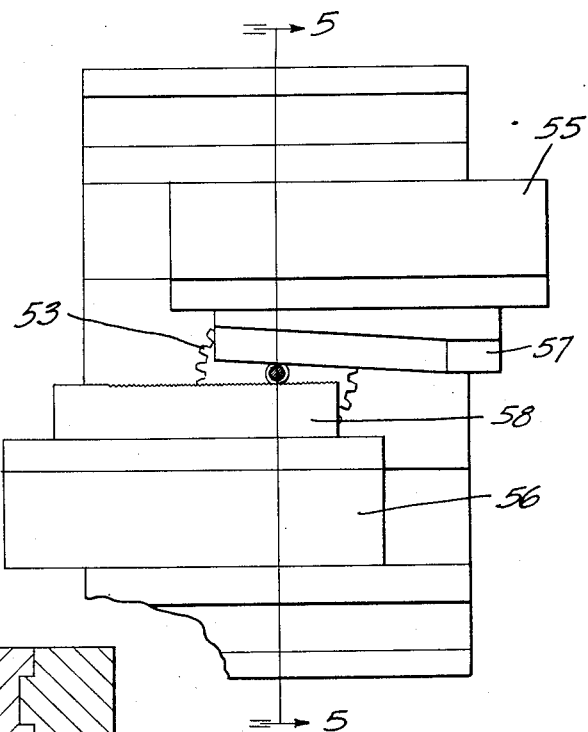
Fig. 4 is an elevation of the cutting off mechanism with the cover plate removed.
Figure 5:
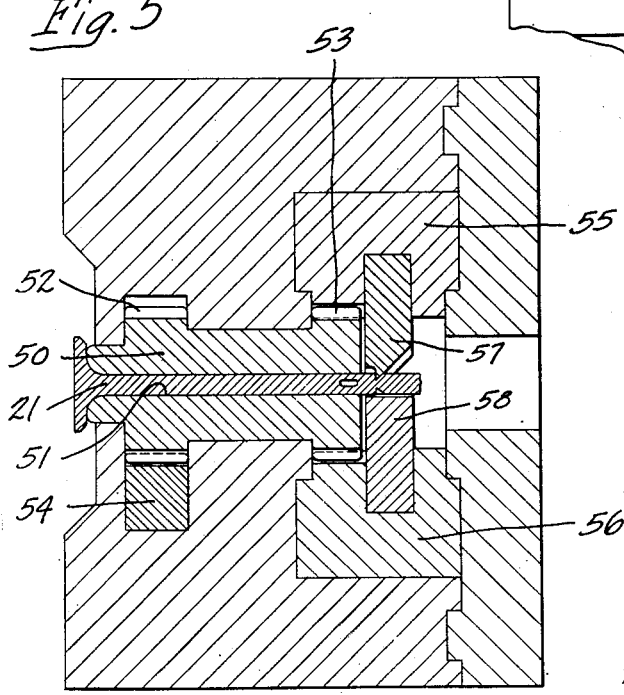
Fig. 5 is a sectional view of the same on line 5—5 of Fig. 4.

The still hot piece 21 is then cut off to the proper length in a machine such as is shown in Figs. 4 and 5. In this machine, a member 50, serving as a double gear and also as a locater and holder for piece 21, is provided with a longitudinal passage 51 for the piece 21 and upon its periphery with the two gears 52 and 53. Gear 52 is driven from a suitable source of power through rack 54 while gear 53 drives two other racks 55 and 56. These racks 55 and 56 carry respectively a knife 57 and an anvil 58. When power is applied to rack 54 to rotate member 50, the knife 57 will move over the piece 21 and, as the knife edge slopes as shown, will cut off the end of piece 21, anvil member 58 moving in synchronism with the knife and supporting the piece during the cut.

After the cutting off operation the valve is practically finished except for a surfacing operation.

In the practice of the process as indicated there is produced a headed article, valve for example, in which the metal is flowed from the head portion into the shank portion and this is clearly shown by an etched section. Such a section has been reproduced in Fig. 6. It will be noted that the flow lines are smooth curves from near the extremity of the head toward the center and continue with uniformity into the stem. As a result there is produced an article which is very much stronger in tension than those produced in any of the ordinary processes. And while wear is taken laterally of the fibrous structure the greatest stresses are longitudinal of the fibres in such articles as valves. In the case of bolts and the like, tensile strength is usually the most important characteristic.

It should be noted that the invention is not to be limited to the use of the particular form of die shown nor to the specific composition of steel mentioned as these may of course be varied. In the case of the steel, the composition mentioned is very hard and difficult to work and it is obvious that softer steels are to be included in the terminology of the claims. The dimensions of the diameter of the head, and of the stem, and the overall length as hereinbefore set forth are given by way of example, and may be considerably varied to suit the needs of manufacture.

I claim:

1. The process of making a valve having a stem and a head consisting in preparing a die having a recess shaped to form a valve seat and an opening from the recess, preparing a blank of steel but slightly smaller than the recess in the die, and extruding a portion of the blank through the opening to form a valve stem and leaving in the recess a shaped head.

2. The process of manufacturing a valve which comprises heating a ferrous slug to the required temperature, partly extruding it from a die to form, without substantial upsetting, a head in said die of substantially the finished diameter of the valve head, and simultaneously extruding a stem for the valve.

3. The process of manufacturing a valve which comprises heating a ferrous slug to the required temperature, pressing it in a die, the die having no working transverse dimensions greatly in excess of the transverse dimension of the slug, to form a head in said die of substantially the finished diameter of the valve, and simultaneously extruding a stem for the valve.

4. The process of manufacturing a valve which comprises bringing a ferrous slug to a suitable temperature, placing said slug in a die having a cavity with a transverse dimension not greatly in excess of that of the slug and of substantially the diameter of the finished valve head and a communicating passage of a diameter not less than the finished stem of the valve, pressing said slug in said die to form an article having a head in said cavity of substantially the finished diameter of the valve and to extrude a stem through the passage, removing said article from the die and thereafter performing one or more operations upon the pressed article to produce a finished valve.

5. The process of manufacturing a valve which comprises bringing a ferrous slug to a suitable temperature, placing said slug in a die having a cavity with a transverse dimension not greatly in excess of that of the slug and of substantially the diameter of the finished valve head and a communicating passage of a diameter not less than the finished stem of the valve, pressing said slug in said die by means of a plunger having a transverse dimension but slightly less than the transverse dimension of the cavity to form an article having a head in said cavity of substantially the finished diameter of the valve head and to extrude a stem through the passage, removing said article from the die and thereafter performing one or more operations upon the pressed article to produce a finished valve.

6. The process of making a valve comprising compressing a heated metallic slug in a die having a cavity to form a valve head and a passage for forming a stem by extrusion, the proportion of the slug and die preventing substantial expansion of the slug, during the operation of extrusion.

7. A valve produced by heating a ferrous slug to the required temperature, partly extruding said slug from a die to form, without substantial upsetting, a head in said die of substantially the finished diameter of the valve head and simultaneously extruding a stem for the valve.

In testimony whereof I affix my signature.

WILLIAM S. KNUDSEN.